Figure 1:
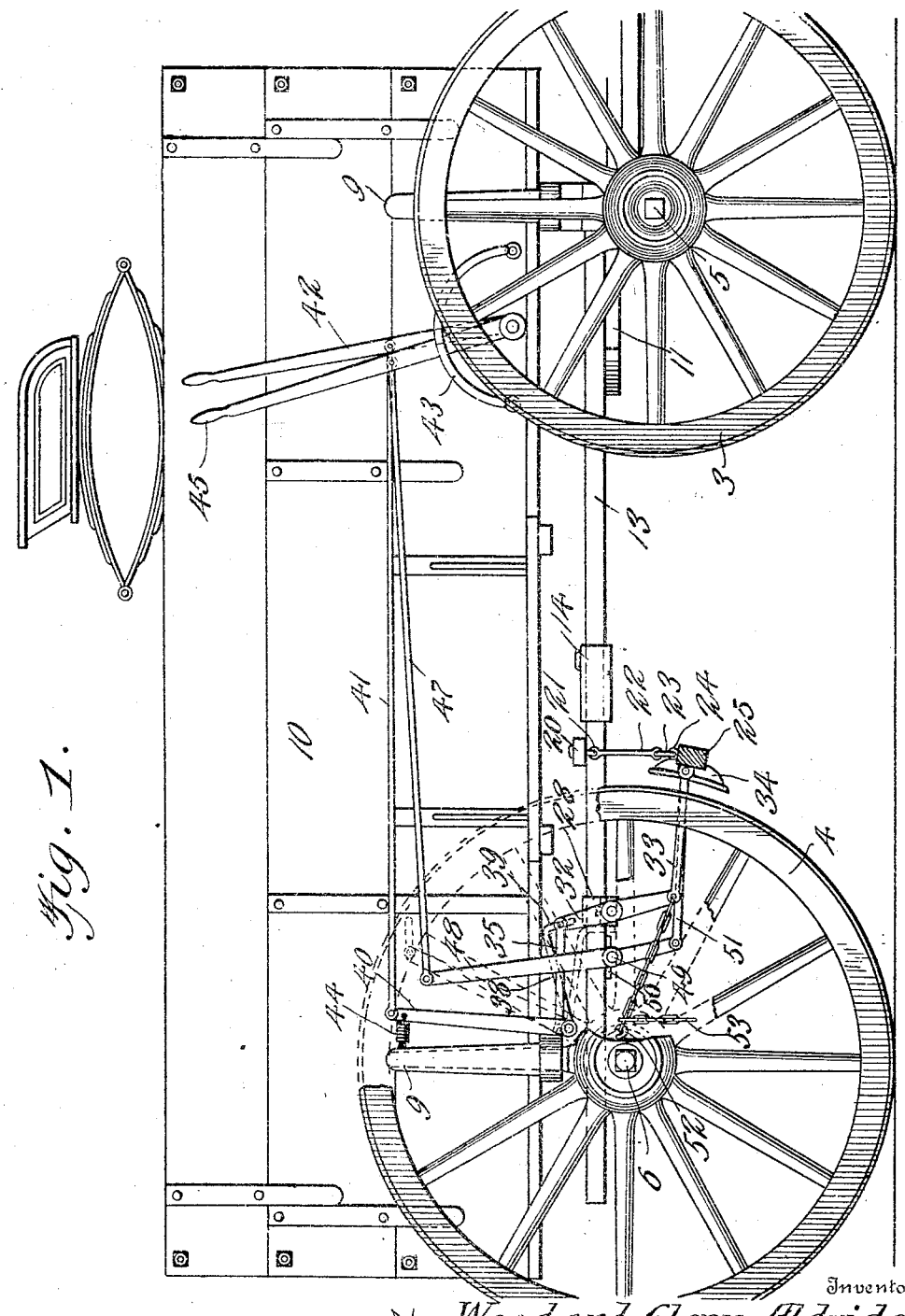

W. G. ALDRIDGE.
WAGON AND AUTO BRAKE.
APPLICATION FILED JUNE 29, 1909.

955,034.

Patented Apr. 12, 1910.
2 SHEETS—SHEET 1.

Witnesses
Frank B. Hofman
Wm Hoeth

Inventor
Woodard Glenn Aldridge
By Victor J. Evans
Attorney

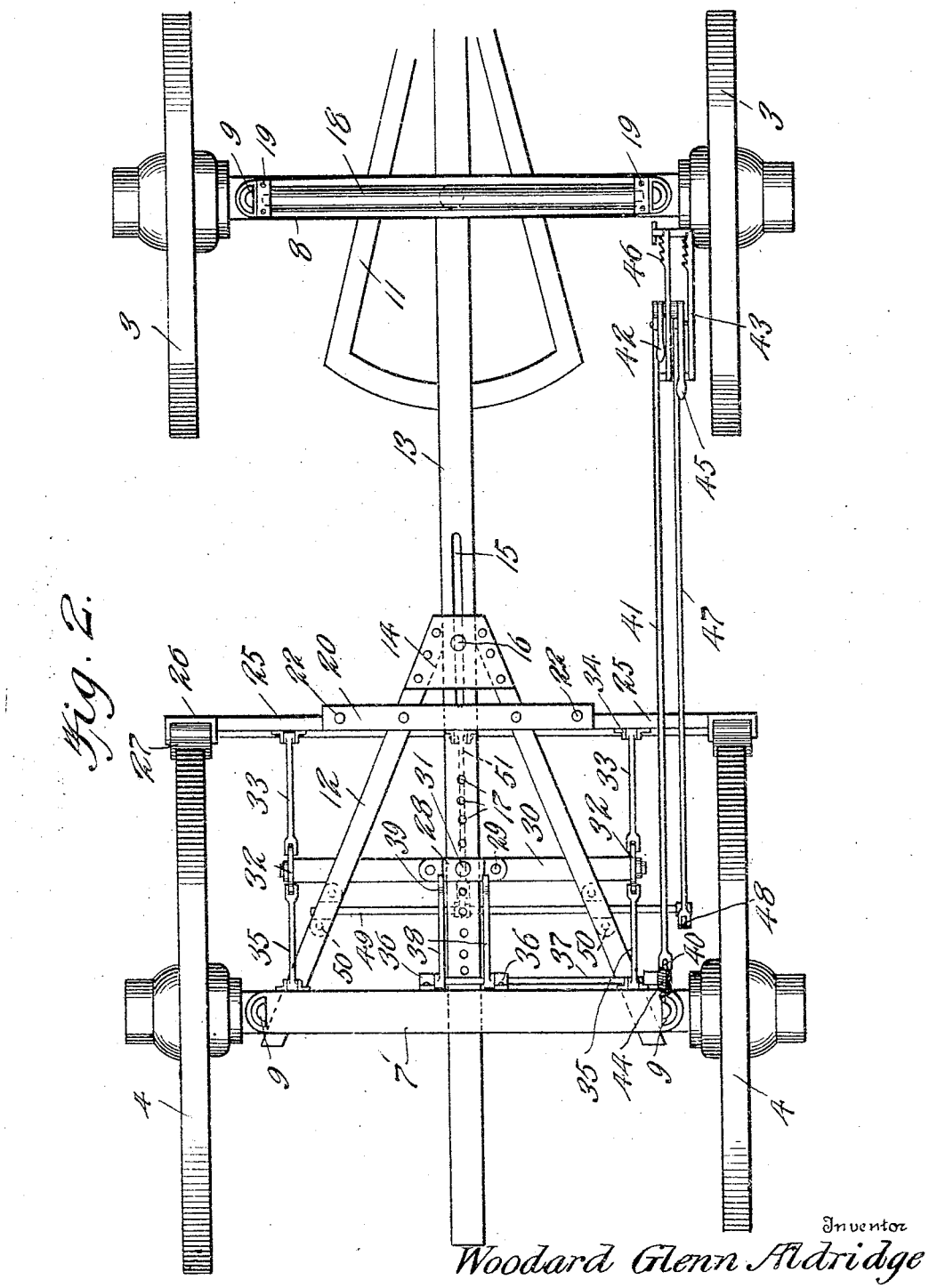

UNITED STATES PATENT OFFICE.

WOODARD GLENN ALDRIDGE, OF SAULSBURY, TENNESSEE.

WAGON AND AUTO BRAKE.

955,034.  Specification of Letters Patent.  Patented Apr. 12, 1910.

Application filed June 29, 1909. Serial No. 505,023.

*To all whom it may concern:*

Be it known that I, WOODARD GLENN ALDRIDGE, a citizen of the United States, residing at Saulsbury, in the county of Hardeman and State of Tennessee, have invented new and useful Improvements in Wagon and Auto Brakes, of which the following is a specification.

This invention relates to improvements in wagons and is primarily directed to a wagon having means whereby the brake will be automatically thrown into engagement with the rear wheels when the wagon is moving downwardly upon an inclined plane, to prevent the wagon contacting the attached drafting animals, and to also prevent the animals of the wagon going beyond the control of the driver.

Another object of the invention is to provide a supplemental means whereby a wagon may be backed upon an inclined plane and preventing the normally automatic brake members from contacting the wheels of the wagon.

A still further object of the invention is to provide means whereby the brake may be manually thrown into engagement with the wheels when the wagon is traveling upon a level surface.

With the above, and other objects in view, which will appear as the description progresses, the invention resides in the novel construction and combination of parts hereinafter fully described and claimed.

In the accompanying drawings, Figure 1 is a side elevation of a wagon constructed in accordance with the present invention. Fig. 2 is a top plan view of the running gear, the body being removed.

In the accompanying drawings the numeral 1 designates the wagon proper, comprising front and rear wheels 3 and 4 mounted upon suitable axles 5 and 6 which are provided with the usual bolsters 7 and 8. Each of the bolsters 7 and 8 are provided with suitable standards 9 between which the body or box 10 of the device is positioned. The front axle 5, as well as the rear axle 6 are provided with hounds 11 and 12. The numeral 13 designates the reach of the wagon which is adapted to project through a suitable collar 14 arranged upon the forward end of the rear hounds 12, and this reach bar is provided with a longitudinally extending slot 15 adapted to be engaged by a pintle 16 depending vertically through the collar 14. The reach bar 13 extends rearwardly beyond the axle 6 between the said axle and the bolster 7. This reach 13 is also provided with a plurality of spaced openings or perforations 17, the purpose of which will presently be set forth. The front bolster 8 is provided, between its standards 9, with a roller 18 having its ends provided with pintles and mounted within suitable bearings 19, and the rear portion of the body 10 is provided upon its bottom with spaced cleats adapted to lie closely against both the front and rear faces of the bolster 7, so as to securely position the rear portion of the said body upon this bolster and to allow the forward under face of the body to lie upon the roller 18.

Securely connected with the rear hounds 12 and at the rear of the collar 14 carried thereby, is a transversely extending bar 20. This bar has its ends projected a suitable distance beyond the sides of the hounds 12 and these ends are each provided with a suitable eye 21 having a rod 22 connecting a link 23 with an eye 24 carried by a brake beam 25. This brake beam 25 has its ends provided with the usual brake shoes 26 which are normally adapted to be positioned a slight distance in advance of the rear wheels 4 and which carry the usual brake blocks 27.

Slidably mounted upon the reach 13 is a U-shaped member 28 which has its arms offset to provide ears 29, whereby the said member is connected with a transversely extending beam 30. The member 28 has its upper face provided with a suitable opening adapted to be positioned within the path of the series of openings 17, and which is also adapted for the reception of a removable pin 31, whereby the member may be adjustably connected with the beam 13. The ends of the beam 30 are pivotally connected with the central portion of rocker arms 32. The lower ends of these arms are connected with links 33 which have their free ends pivoted in bearings 34 provided upon the brake beam 25. The opposite portions of the rocker arms 32 are connected with links 35 which are pivotally connected with the rear bolster 7 of the running gear.

From the above description, taken in connection with the accompanying drawings, it will be noted that should a wagon descend a hill the body 10, being attached to the rear bolster of the running gear and being slidably mounted upon the roller 18 of the bolster 8, will cause the rear hounds 12 to travel forwardly upon the reach 13, thus braking the toggle joint provided by the members 35, 32 and 33 and cause the lower portion of the rocker arm to move upon the rear axle and to force the brake blocks 27 tightly into engagement with the rear wheels of the device to effectively brake the same. It will be still further noted that the greater the weight of the wagon body 10 or the contents thereof, the greater the pressure will be of the brake against the rims of the wheel 4.

It is frequently desirous to prevent the application of the brakes to the wheels, even when descending an incline, and in order to provide for this I have mounted in suitable bearings 36, positioned upon the rear bolster 7, a transversely arranged shaft 37 having a pair of arms 38 provided at their extremities with inclined fingers 39. These fingers 39 are positioned directly in the path of the rear face of the bar 30 and the forward end of the shaft 37 is provided with a vertically disposed arm 40. This arm 40 is pivoted to a longitudinally extending rod 41 which is connected with a lever 42 having a spring-pressed pawl, or, if desired, an offset engaging with teeth of a segmental rack 46.

Positioned between and connecting the arm 40 and the standard 9 is a compression spring 44 which is adapted to normally force the member 40 toward the standard 9 so as to cause the offset portions of the arms 38 provided upon the shaft 37, which is connected with the arm 40, to be normally retained out of engagement with the transverse bearing 30.

By this arrangement it will be noted that upon operating the lever 42, the offset fingers 39 will be caused to contact with the inner face of the bar 30, thus preventing the forward movement of the wagon body and the application of the brake members.

The numeral 45 designates the main hand brake lever. This lever may be provided with an offset portion adapted to engage with the teeth of the segmental rack 46, and the said lever is provided with a rearwardly extending rod 47 connected with a link 48 which in turn is connected with a transverse bar or rod 49 mounted in suitable bearings 50 upon the members of the rear hound 12. The depending portion of the link 48 below its pivotal connection with the rod 49 is provided with a longitudinally extending pivoted link 51 which in turn is pivotally connected with the brake beam 25. By this arrangement it will be noted that when the lever 45 is operated, the toggle connection provided by the members 33, 32 and 35 will be broken as the wheels 4 and the brake shoes 34 are brought together, it being understood that both the brake beam 25 and the rear wheel 4 are moved in opposite directions when pressure is exerted upon the lever 45 the parts can be readily swung into engagement when desired without interfering with the remaining elements of the device. The axle 6 may also be provided with suitable hooks 52, which may engage with one of the links of a chain 53 connected with the member 33. The idea of providing the chain 53 is to limit the outward movement of the brake blocks 27 as well as to compensate for the wear of the blocks incidental to their contacting the rims of the wheels 4 it being understood that this take-up is accomplished by positioning the various links of the chain within the hooks 52.

From the above description, taken in connection with the accompanying drawings, it will be noted that I have provided a comparatively simple, cheap and effective device for the purpose intended, one wherein a vehicle may be effectively braked upon an incline, one wherein a vehicle may be allowed to descend an incline without the application of the brake if desired, one which may be backed upon an incline without the application of the brake if desired, and it is to be understood that while I have illustrated and described the preferred embodiment of the invention, as it now appears to me, minor details of construction, within the scope of the following claims may be resorted to if desired.

Having thus described the invention what is claimed as new is:—

1. A running gear for wagon bodies and a body therefor, said body being securely connected to the rear bolster of the running gear and slidably mounted upon the front bolster thereof, a reach for the bolsters, said reach being provided with a longitudinally extending slot, hounds for the rear bolster connected with the longitudinal slot of the reach, said reach being also provided with a plurality of spaced vertical openings, a transverse beam provided with a central collar having a pintle engaging one of these openings, a link pivotally connected with the end of the beam, a connection between the link and the rear bolster, a transverse bar upon the reach, a brake beam loosely connected with the transverse bar, brake shoes upon the beam within the path of the rear wheels, a connection between the brake beam and the lower end of the link, and adjustable means for retaining the brake shoes in proper spaced relation to the rear wheels.

2. A running gear for vehicles, a roller upon the front bolster of the running gear, a body removably secured to the rear bolster of the running gear, a reach for the bolsters, said reach being provided with a plurality of spaced openings and an elongated slot, rear hounds for the running gear having their forward ends provided with a pintle positioned within the elongated slot, a transverse beam upon the reach, a link upon the beam, a brake beam connected with the link, brake shoes for the brake beam adapted to lie within the path of the rear wheels of the running gear, a second transverse beam provided with a collar having a pintle connected with one of the openings of the reach, a member centrally connected with the ends of the beam, a link connection between this member and the brake beam, a link connection between the said member and the rear bolster, adjustable means for retaining the brake shoes in proper spaced relation with the rear wheels, offset arms mounted upon the bolster adapted to contact the second transverse beam, and means for manually operating the brakes.

3. A running gear for vehicles having its front bolster provided with a transversely extending roller, a body for the running gear, said body being removably connected with the rear bolster and adapted to lie upon the roller of the front bolster, a reach secured to the front bolster and slidably connected with the rear bolster, said reach having a plurality of vertical openings and an elongated slot, hounds secured to the rear bolster and having their forward ends provided with a pintle positioned within the elongated slot, a swinging brake beam connected with the reach, brake shoes for the beam, means for adjusting the brake shoes in spaced relation with the rear wheels of the running gear, a transverse beam having a collar slidably mounted upon the reach, a pintle for the collar adapted to engage one of the openings provided by the reach, a member centrally pivoted to the transverse beam, a pivoted connection between the lower end of the said member and the brake beam, a pivotal connection between the upper end of the member and the rear bolster, offset arms pivoted to the rear bolster and adapted to overlie the transverse beam, a lever for operating the offset arms, and a second lever having a linked connection with the brake beam, substantially as and for the purpose set forth.

In testimony whereof I affix my signature in presence of two witnesses.

WOODARD GLENN ALDRIDGE.

Witnesses:
W. E. BAILEY,
F. E. FLOYD.